Oct. 26, 1954
C. F. WOOD ET AL
2,692,797
GAS TURBINE APPARATUS
Filed June 10, 1949
2 Sheets-Sheet 1
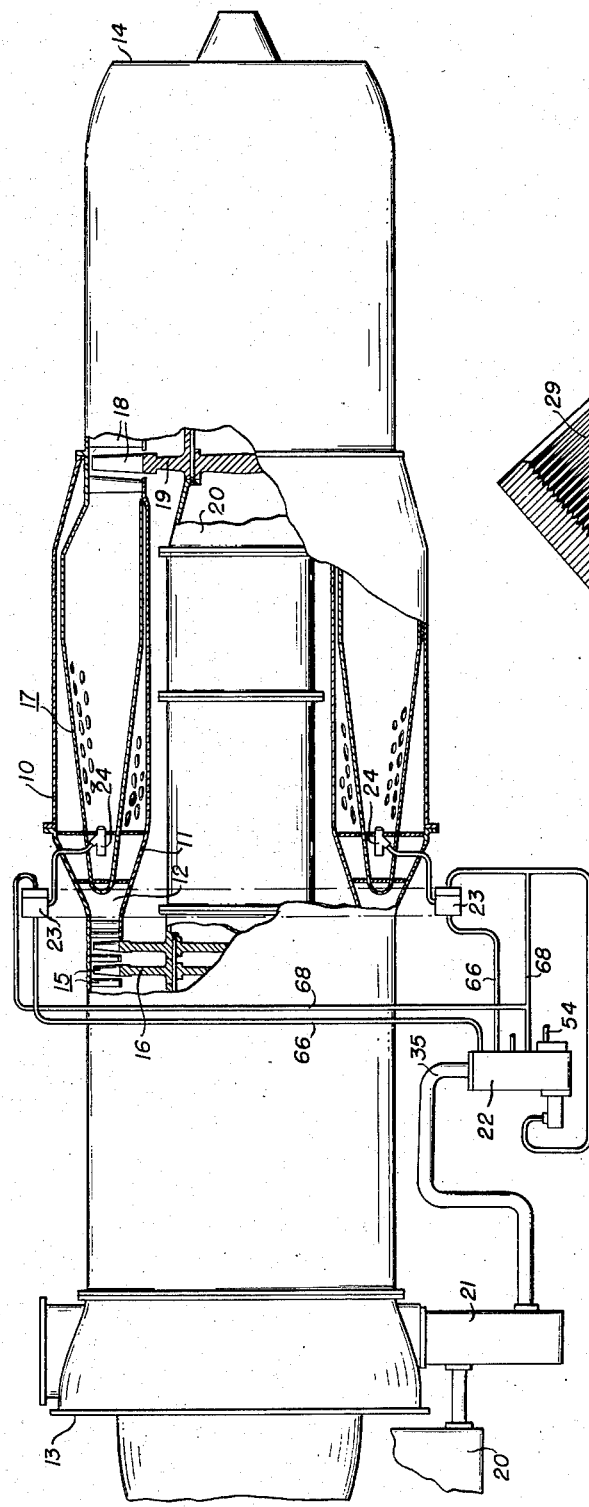
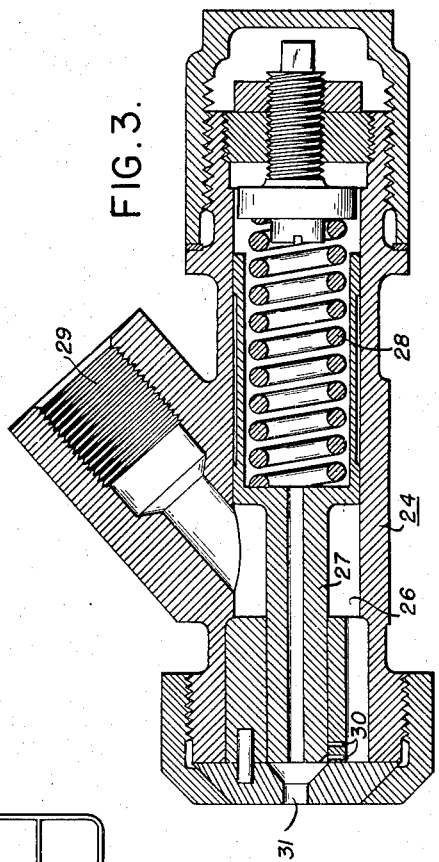
INVENTORS
Linn F. Cummings
Cyrus F. Wood
BY
ATTORNEY Oct. 26, 1954   C. F. WOOD ET AL   2,692,797
GAS TURBINE APPARATUS
Filed June 10, 1949   2 Sheets-Sheet 2

INVENTORS
Linn F. Cummings
Cyrus F. Wood
BY
ATTORNEY

Patented Oct. 26, 1954

2,692,797

UNITED STATES PATENT OFFICE 2,692,797

GAS TURBINE APPARATUS

Cyrus F. Wood, Swarthmore, and Linn F. Cummings, Media, Pa., assignors to Westinghouse Electric Corporation, East Pittsburgh, Pa., a corporation of Pennsylvania Application June 10, 1949, Serial No. 98,334

9 Claims. (Cl. 299—58)

This invention relates to fuel supply systems, and more particularly to fuel supply apparatus for aircraft power plants.

In the operation of an aviation turbojet or turboprop engine at altitudes above 40,000 feet, it is desirable that means be provided for insuring constant and uniform distribution of equal quantities of fuel throughout the combustion zones of the burner apparatus, in order to prevent disturbance of combustion stability under the conditions of vaporization, effusion of air and heat effect encountered at these altitudes. It has been proposed to provide the desired division of fuel flow by utilizing a number of diaphragm operated relief valves individually supplied with fuel by paralleled fixed orifices of identical flow areas, under control of a pressure established by flow of fuel through a master orifice. The latter pressure is balanced against the downstream pressures of each of the fixed orifices within the respective diaphragm relief valves, so that the same pressure drop is established across all orifices. Since all of the orifices have the same area, maintenance of equal pressure drops thereon will insure equal flow of fuel from each diaphragm relief valve.

Fixed orifice apparatus of the foregoing type may prove inadequate, however, to maintain supply of fuel over a sufficiently wide range for operation at both sea level and high altitude without exceeding available fuel pressures. The range requirement of a fuel system is defined as the ratio of its maximum flow requirement to its minimum flow requirement. Assuming a system having a 10 to 1 range requirement and using the above-described flow divider with orifices of fixed area, the maximum fuel pressure required to operate such a system is equal to the square of the maximum flow ratio, if the minimum pressure drop is assumed to be one pound per square inch. Accordingly, a 10 to 1 system would require a maximum pressure of 100 pounds per square inch, a 25 to 1 system would require a maximum pressure of 625 pounds per square inch, and a 40 to 1 system would require a maximum pressure of 1600 pounds per square inch. In actual practice, a maximum fuel system pressure of 600 pounds per square inch is considered to be the preferred limit for aircraft engines. Therefore, with allowance for normal fuel system pressure drop, the above described flow divider using metering orifices subject to the fixed area square law has a maximum range on the order of 25 to 1. For fuel flow ranges in excess of 25 to 1 the maximum pressure requirements become excesisve and fuel metering accuracy at the low flow condition, which is the most critical, would be very unsatisfactory.

It is a principal object of the present invention to provide an improved fuel flow divider or distributing apparatus for an aircraft engine operative to deliver suitable quantities of fuel to the engine over the required range without necessitating the use of excessively high fuel pressures. A feature of the improved fuel flow divider is the provision of variable orifices operative to pass a maximum flow when fully opened and to effect reduction in flow as the flow areas of the orifices are reduced consequent to a drop in fuel requirements, so that maximum and minimum pressure drops are held to a reasonable level.

It has been proposed to equip a gas turbine engine with pressure responsive nozzles of a variable orifice type, through the medium of which a desired volume flow of fuel can be maintained at a suitable pressure and at a relatively constant velocity and spray discharge angle. It is another object of the present invention to provide fuel supply apparatus cooperative with variable orifice nozzles of this character to effect uniform distribution of fuel under pressure to all areas of the combustion chamber.

Another object of the invention is the provision of an improved fuel supply apparatus for a gas turbine engine having a plurality of fuel nozzles including means for equalizing the pressure and flow of fuel of the respective nozzles over a wide range.

Another feature of the invention is the provision, in a system having a source of fuel under pressure and a plurality of fuel delivery points, of fuel distributing apparatus comprising a fuel flow divider or distributing valve device operative to establish a control pressure while metering fuel from the source to the delivery points at uniform flow rates which are varied according to available fuel pressure, together with a plurality of balancing valves or feed valve devices subject to the control pressure for insuring supply of fuel to the delivery points at substantially equal pressures.

Other characteristics of the invention include the provision of fuel distributing apparatus suitable for use with aviation gas turbine engines of either existing or advanced design, and adapted to respond to the rate of supply of fuel over a wide range, as determined by the usual fuel governor and control apparatus, for controlling communication from the governor apparatus to each of a plurality of nozzles, which are rendered uniformly operable to deliver the selected quantity of fuel to the combustion chamber without necessitating the use of fuel pressures exceeding values which can be conveniently utilized in an aircraft engine.

These and other objects are effected by the invention as will be apparent from the following description and claims taken in connection with the accompanying drawings, forming a part of this application, in which:

Fig. 1 is a schematic elevational view, partly in section, of an aviation gas turbine power plant of the type with which the invention may be employed;

Fig. 3 is an enlarged-detail sectional view of one of the fuel discharge nozzles shown in Fig. 2.

Figure 2:
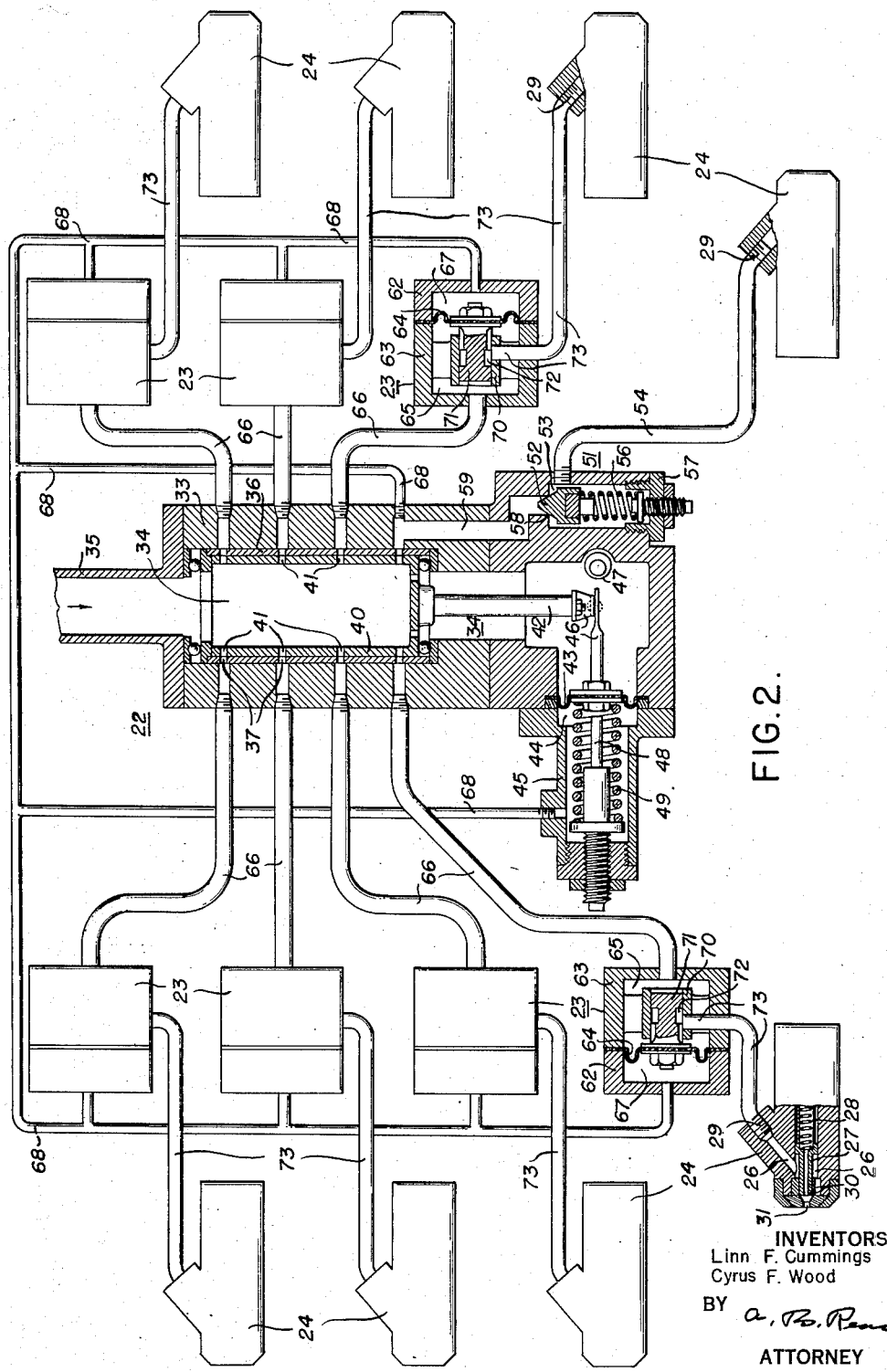
Fig. 2 is a diagrammatic view of improved fuel distributing apparatus constructed in accordance with the invention and adapted for association with the power plant shown in Fig. 1.

In Fig. 1 of the drawings, the invention is illustrated in association with the combustion apparatus of a conventional gas turbine engine, which in the form shown comprises a cylindrical outer casing structure 10 having mounted therein a sectional core structure 11, which with the casing structure 10 defines an annular flow passageway 12 that extends longitudinally through the apparatus from a frontal air intake opening 13 to a rearwardly disposed discharge nozzle 14. The casing structure 10 is adapted to be mounted in or on the fuselage or wing of an aircraft (not shown), with the intake opening 13 pointed in the direction of flight. The axially aligned operating elements of the engine disposed in the casing structure 10 include an axial flow compressor 15 having a rotor 16, annular fuel combustion apparatus 17, and a turbine 18, the rotor 19 of which is operatively connected to the compressor rotor 16 through the medium of a hollow shaft 20, which may be suitably journaled in the casing structure. In operation, air drawn into the intake opening 13 is compressed by the compressor 15 and delivered to the combustion apparatus 17, to which fuel is supplied by way of apparatus hereinafter described. The resultant hot motive gas is then supplied from the combustion apparatus to the turbine 18, and is finally discharged through the nozzle 14 in the form of a jet establishing a propulsive thrust.

According to the invention, the fuel supply system may comprise a reservoir 20, governor and pump apparatus 21 of any desired type for supplying fuel at a selected pressure, a flow divider or distributing valve device 22, and a plurality of pressure balancing valves or equalizing valve devices 23, which are individually operative to supply fuel to the required number of fuel nozzles 24 associated with the combustion apapratus 17. These nozzles are preferably of the variable orifice type, and may each have the construction illustrated in Fig. 3, comprising a casing 24 having a bore 26 in which a piston valve 27 is slidably mounted. The piston valve 27 is subject to the opposing pressures of a spring 28 and of fuel admitted to the bore 26 by way of an inlet passage 29, and is operative to uncover one or more ports 30, according to the fuel pressure, for effecting discharge of fuel from the bore through an outlet opening 31.

Referring now to Fig. 2 of the drawings, the distributing valve device 22 comprises a casing structure 33 having a chamber 34 which communicates through a conduit 35 with the discharge side of the governor and pump device 21 shown in Fig. 1. Mounted in the upper end of the chamber 34 is a cylindrical bushing 36 in which are formed a plurality of outlet orifices or ports 37 corresponding in number to the nozzles 24. For varying the flow areas of the ports 37 there is provided a sleeve valve member 40, which is rotatably mounted in the bushing 36 and which has ports 41 adapted to register with the respective ports 37. The sleeve valve member 40 has an axial shaft 42 which extends into the lower end of the chamber 34, where a diaphragm 43 is mounted between that chamber and a chamber 44, formed in a section 45 of the casing structure, for turning the shaft through the medium of suitable linkage 46. Movement of the linkage in one direction is limited by an adjustable stop cam 47 carried by the casing structure 33, and in the other direction by an adjustable stop rod 48 disposed in the chamber 44 of the casing section 45. A coil spring 49 is interposed between the diaphragm 43 and a wall of the chamber 44 for biasing the diaphragm toward a normal position, which may be the position in which the flow areas of ports 41 and 37 will be a minimum.

Also mounted in the casing structure 33 is a control valve or reducing valve device 51, comprising a valve element 52 which is disposed in a valve chamber 53 communicating through a conduit 54 with the inlet 29 of one of the nozzles 24. A spring 56 is interposed between a plug 57 and the valve element 52 for urging the latter toward a seat 58 to control communication between the valve chamber 53 and a passage 59 leading from one of the ports 37.

Each of the similar equalizing valve devices 23 associated with the individual nozzles 24 comprises casing sections 62 and 63 between which is clamped a diaphragm 64, the casing sections and diaphragm cooperating to provide, on one side of the diaphragm, a valve chamber 65 communicating through a conduit and passage 66 with one of the ports 37 in the distributing valve device 22, and at the other side a chamber 67 which is connected to a control conduit 68. The control conduit 68 communicates with the passage 59 and with the chamber 44 of the distributing valve device 22. Mounted in a guide 70 in each valve chamber 65 is a slide valve 71, which is operatively connected to the diaphragm 64 and has an annular groove 72 for controlling communication between the valve chamber 65 and a port and conduit 73 communicating with the inlet 29 of the associated nozzle 24.

The apparatus shown in Figs. 1 and 2 operates as follows: fuel under pressure delivered by the governor and pump equipment 21 is supplied by way of the conduit 35 to the chamber 34 of the distributing valve device 22, and thence flows through the registering orifices or ports 41 and 37 and related conduits 66 to the valve chambers 65 of the several equalizing valve devices 23. At the same time, the valve element 52 is operated by fuel under pressure flowing through the passage 59 to meter some of the fuel through conduit 54 to the corresponding nozzle 24, while the back pressure of fuel in passage 59 constitutes a control pressure and is communicated by way of the control conduit 68 to the diaphragm chamber 67 of each equalizing valve device 23, and also to the chamber 44 of the distributing valve device 22. The diaphragms 64 of all equalizing valve devices 23 and diaphragm 43 in chamber 44 of the distributing valve device 22 are thus subjected to the same control pressure for rendering uniform the rate of flow of fuel by way of the associated slide valves 71 to the connected nozzles.

Since the adjustment of the rotary sleeve valve 40 of the distributing valve device 22 is effected by operation of the diaphragm 43 and linkage 46 in accordance with the pressure of fuel initially supplied to the chamber 34, the flow areas of all the registering ports 37 and 41 will be such as to pass the largest flow at maximum fuel pressure, or to reduce the rate of flow in proportion to a drop in fuel demand, within a reasonable range of maximum and minimum fuel pressures. Upon an increase in the pressure of fuel supplied to the chamber 34, the diaphragm 43 will be forced outwardly against the pressure of the spring 49 and of fuel at the control pressure in chamber 44, thereby turning the shaft 42 and sleeve valve 40 to increase the flow areas of all of the ports 37—41, simultaneously. Likewise, upon a reduction in fuel pressure in chamber 34, the spring 49 and control fuel pressure in chamber 44 will become effective to operate the sleeve valve 40 to reduce the rate of flow of fuel to the equalizing valve devices 23 and nozzles 24. Each change in fuel pressure and rate of flow through ports 37 and 41 will of course be effected without substantially changing the ratio of that pressure to the pressure of fuel maintained in conduit 63 by the valve device 51. All of the equalizing valve devices 23 will consequently be at all times operative in unison to ensure adequate and uniform supply of fuel at the selected rate to the associated nozzles, in accordance with the positioning of the distributing valve device 22 and the relatively constant pressure maintained in the control conduit 63.

The apparatus will thus effect equal division of fuel flow to the variable area fuel nozzles 24 so as to facilitate maintenance of flow balance and consistency of fuel distribution in the gas turbine engine. Such a control is readily operable to effect the desired fuel flow division over a 40 to 1 fuel pressure range without exceeding the limit of 600 pounds per square inch maximum fuel pressure which is regarded as suitable for aircraft engines.

While we have shown our invention in but one form, it will be obvious to those skilled in the art that it is not so limited, but is susceptible of various changes and modifications without departing from the spirit thereof.

What we claim is:

1. Fuel supply apparatus for effecting equal flows of fuel under pressure to a plurality of delivery points, comprising a source of fuel under pressure, a distributing valve device having a chamber communicating with said source and with a plurality of ports of equal size, an apertured valve element movable in said chamber and operable to effect like variations in the flow areas of all said ports simultaneously according to the flow of fuel delivered from said source, a plurality of fuel discharge devices, means for establishing a control fluid pressure, and a plurality of equalizing valve devices subject to the opposing pressures of said control fluid and of the fuel flowing through said ports, respectively, for controlling the supply of fuel to the corresponding discharge devices.

2. In a fuel system including a source of fuel under pressure and a plurality of nozzles for discharging atomized fuel, the combination of a distributing valve device having a plurality of ports of equal size communicating with said source of fuel and common valve means for controlling the flow areas of said ports according to the flow of fuel delivered from said source, said valve means being cooperatively related to all said ports jointly for establishing the same flow areas simultaneously, reducing valve means for controlling comunication from one of said ports to one of said nozzles, said reducing valve means being constructed and arranged to effect supply of fuel under pressure to said one of said nozzles and to establish a control pressure in excess of the pressure applied to the latter nozzle, and a plurality of equalizing valve devices for controlling flow of fuel from said ports to the remaining nozzles, respectively, each of said equalizing valve devices being subject to said control pressure and to the opposing pressure of fuel flowing from the associated port.

3. In a fuel system including a source of fuel under pressure and a plurality of atomizing nozzles, in combination; a distributing valve device comprising a casing having a plurality of ports and a chamber communicating with said source, a rotary sleeve valve member mounted in said chamber for varying the flow areas of said ports; a spring, a reducing valve subject to pressure of said spring for supplying fuel under pressure to one of said nozzles and establishing a control pressure in excess of the pressure applied to the latter nozzle; means including a biasing spring and responsive to the difference in pressure of fuel in said chamber and said control pressure plus said biasing spring for adjusting said sleeve valve member; and a plurality of equalizing valve devices associated with said nozzles for controlling flow of fuel thereto from said ports, respectively, in accordance with said control pressure and the pressure of fuel flowing from said ports.

4. In a fuel system including a source of fuel under pressure and a plurality of atomizing nozzles, in combination; a distributing valve device comprising a casing having a plurality of ports and a chamber communicating with said source, a rotary sleeve valve member mounted in said chamber for varying the flow areas of said ports; a spring, a reducing valve device subject to pressure of said spring for supplying fuel under pressure to one of said nozzles and establishing a control pressure in excess of the pressure applied to the latter nozzle; means including a biasing spring and responsive to the difference in pressure of fuel in said chamber and said control pressure plus said biasing spring for adjusting said sleeve valve member; and a plurality of equalizing valve devices associated with said nozzles for controlling flow of fuel thereto from said ports, respectively, each of said equalizing valve devices comprising a fluid pressure responsive valve subject to said control pressure and the opposing pressure of fuel flowing from said ports.

5. A control valve device for distributing fuel from a source of fuel under pressure to a plurality of discharge points comprising a cylindrical casing having a fuel receiving chamber communicating with said source and a plurality of ports communicating with said discharge points, respectively, a sleeve valve member rotatably mounted therein and having ports registering with the first-named ports to vary the effective flow areas thereof, an operating element for said sleeve valve member, control valve means operative to establish a control fluid pressure, and fluid pressure responsive adjusting means for said sleeve valve member including a spring and a movable abutment operatively connected to said operating element, said abutment being subject to the opposing pressures of fluid in said chamber, and of said spring plus said control pressure.

6. A control valve device for distributing fuel from a source of fuel under pressure to a plurality of discharge points comprising a cylindrical casing having a fuel receiving chamber communicating with said source and a plurality of ports communicating with said discharge points, respectively, a sleeve valve member rotatably mounted therein and having ports registering with the first-named ports to vary the effective flow areas thereof, an operating element for said sleeve valve member, control valve means operative to establish a control fluid pressure, and fluid pressure responsive adjusting means for said sleeve valve member including a spring, a movable abutment operatively connected to said operating element, and adjustable stops for limiting the movement thereof, said abutment being subject on one side to the pressure of fuel in said chamber and on the other side to the force of said spring plus said control pressure.

7. In fuel regulating apparatus for effecting equalized supply of fluid fuel to a plurality of fuel discharge points, a source of fluid fuel under pressure, a flow divider device having a chamber communicating with said source, said flow divider device having a plurality of supply communications connecting said chamber to all said fuel discharge points, a metering restriction interposed in each of said supply communications upstream of said discharge points, common control valve means for simultaneously varying the flow areas of said metering restrictions in accordance with the pressure of fuel delivered from said source to said chamber, an equalizing valve interposed in each of said supply communications downstream of the metering restriction therein, a movable abutment operatively connected to each of said equalizing valves and subject on one side to the pressure of fuel in its associated supply communication downstream of the metering restriction therein, and means for conducting a regulating fluid under pressure to the opposite side of each of said movable abutments for maintaining the pressure downstream of said metering restrictions at a given value in all said supply communications, thereby rendering the flow of fuel to said discharge points proportional to the pressure drop across said variable area metering restrictions.

8. In an automatic flow regulating system for fluids, a manifold device adapted to receive the fluid to be regulated, said manifold device having a plurality of conduits branching therefrom for conducting the fluid to points of discharge, a variable area metering restriction in each of said branch conduits upstream of each of said points of discharge, common means operative for simultaneously varying the flow areas of said metering restrictions, an equalizing valve in each conduit downstream of each variable area metering restriction, said manifold being common to said branch conduits for maintaining the pressure upstream of said variable area restrictions substantially equal in all conduits, a movable wall connected to each of said valves, each said wall being subjected on one side thereof to the pressure of fluid in its associated conduit downstream of the restriction in said conduit, and means for conducting a regulating fluid to the opposite side of each said wall to thereby maintain the pressure downstream of said variable area restrictions at a given value or values in all conduits and thereby render the flow of fluid to said discharge points proportional to the drop across said restrictions.

9. A fluid distributing system comprising a plurality of valve housings, each of said housings having a movable member dividing said housing into first and second chambers, each of said housings also having a fluid discharge opening communicating with said first chamber and having a valve connected to the associated movable member for controlling the associated discharge opening; a fluid manifold; first passageways connecting said manifold with each of said first chambers; means for supplying a fluid under pressure to said manifold for distribution therefrom through said passageways, through the first chambers and thence through the discharge openings of said chambers, the fluid pressure in each of said first chambers urging the associated movable member in a direction for opening its valve; means providing a source of fluid pressure less than the pressure of the fluid supplied to said manifold; second passageways connecting said source of fluid pressure with each of said second chambers, the fluid pressure in each of said second chambers urging the associated movable member in a direction for closing its valve, a restrictive orifice in each of said first passageways, common valve means cooperative jointly with all said orifices for varying the flow areas thereof simultaneously, and means responsive to the pressure of fluid supplied to said manifold for actuating said common valve means.

References Cited in the file of this patent

UNITED STATES PATENTS

| Number | Name | Date |
|---|---|---|
| 860,914 | Haley | July 23, 1907 |
| 1,938,943 | Terry | Dec. 12, 1933 |
| 1,995,601 | Browne | Mar. 26, 1935 |
| 1,999,834 | Ernst | Apr. 30, 1935 |
| 2,411,312 | Yonkers | Nov. 19, 1946 |
| 2,430,264 | Wiegand et al. | Nov. 4, 1947 |

FOREIGN PATENTS

| Number | Country | Date |
|---|---|---|
| 526,869 | Germany | June 11, 1931 |
| 577,132 | Great Britain | May 7, 1946 |